United States Patent
Davis

(10) Patent No.: US 9,254,823 B1
(45) Date of Patent: Feb. 9, 2016

(54) VEHICLE BRAKE CONTROL SYSTEM

(71) Applicant: Davis Intellectual Properties LLC, Asheville, NC (US)

(72) Inventor: Shannon R. Davis, Weaverville, NC (US)

(73) Assignee: Davis Intellectual Properties LLC, Asheville, NC (US)

( * ) Notice: Subject to any disclaimer, the term of this patent is extended or adjusted under 35 U.S.C. 154(b) by 44 days.

(21) Appl. No.: 14/183,898

(22) Filed: Feb. 19, 2014

Related U.S. Application Data

(60) Provisional application No. 61/767,014, filed on Feb. 20, 2013.

(51) Int. Cl.
    *B60T 8/17* (2006.01)
    *B60T 7/08* (2006.01)

(52) U.S. Cl.
    CPC .............. *B60T 8/1701* (2013.01); *B60T 7/085* (2013.01)

(58) Field of Classification Search
    CPC ............................... B60T 8/1701; B60T 7/085
    USPC .......................................................... 701/70
    See application file for complete search history.

(56) References Cited

U.S. PATENT DOCUMENTS

| | | | | |
|---|---|---|---|---|
| 5,471,894 A | * | 12/1995 | McFadden | 74/336 R |
| 5,622,088 A | * | 4/1997 | Reid | 74/606 R |
| 5,722,293 A | * | 3/1998 | McFadden | 74/336 R |
| 5,839,419 A | * | 11/1998 | Hawley | 123/398 |
| 6,050,384 A | * | 4/2000 | Hammond | 192/221 |
| 6,406,398 B1 | * | 6/2002 | Hughes et al. | 475/116 |
| 6,678,214 B1 | * | 1/2004 | McMahon | 368/6 |
| 6,721,648 B2 | * | 4/2004 | Masters et al. | 701/110 |
| 6,814,196 B2 | * | 11/2004 | Voit | 192/13 R |
| 7,066,075 B1 | * | 6/2006 | Callis, Jr. | 91/461 |
| 7,273,434 B1 | * | 9/2007 | Rossler | 475/116 |
| 7,344,012 B2 | | 3/2008 | Ward et al. | |
| 7,866,762 B1 | * | 1/2011 | Hamilton | 303/20 |

FOREIGN PATENT DOCUMENTS

| | | |
|---|---|---|
| EP | 1 000 794 | 2/2005 |
| EP | 1 564 055 | 8/2005 |

OTHER PUBLICATIONS

"Pulse Leash" by randyrw published 1/4/2913, www.youtube.com/watch?v=waDlfGpdiJQ.*

"Leash Electronics, Your high performance electronics and wiring solutions," Copyright 2011-2014, Leash Electronics, retrieved Jul. 8, 2014, http://www.leashelectronics.com/New-Pulse-Leash-push-button-staging-system-PL2000.htm, 3 pages.

* cited by examiner

*Primary Examiner* — Mary Cheung
*Assistant Examiner* — Frederick Brushaber
(74) *Attorney, Agent, or Firm* — Fish & Richardson P.C.

(57) ABSTRACT

In general, the subject matter described in this disclosure can be embodied in methods, systems, and program products for releasing a vehicle brake. A computing system receives an indication that a user has provided input to cause a momentary release in a vehicle braking system. The computing system provides a signal so as to cause the momentary release in the vehicle braking system. A length of the momentary release in the vehicle braking system is independent of a length of time that the user provided the input to cause the momentarily release in the braking system.

14 Claims, 4 Drawing Sheets

VEHICLE BRAKE CONTROL SYSTEM

CROSS REFERENCE TO RELATED APPLICATIONS

This application claims the benefit of priority under 35 U.S.C. §119(e) to U.S. Application No. 61/767,014 filed Feb. 20, 2013. The prior application is incorporated herein by reference in its entirety.

TECHNICAL FIELD

This document generally relates to a vehicle brake control system.

BACKGROUND

Drivers of drag race vehicles such as cars and motorcycles may position their vehicles in a staging area before the tree activates the green light and the vehicles are permitted to accelerate off of the line. Racing rules, however, may limit the amount of time that vehicles can rest in the staging area. Some vehicles may take an extended period of time to raise energy to a high power band, for example, to spool turbochargers up to their maximum capability.

SUMMARY

This document describes techniques, methods, systems, and other mechanisms for a vehicle brake control system.

Particular implementations can, in certain instances, realize one or more of the following advantages. Vehicles may have a mechanism to move forward from the pre-staging area to the staging area, and still remain revved up for an extended period of time. The distance moved may be independent of the length of the user input that is applied by the user, and the distance moved may be governed by a separate user input device, providing the user with a level of control over movement of the vehicle into the staging area.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes a vehicle brake control system.

Figure 1:
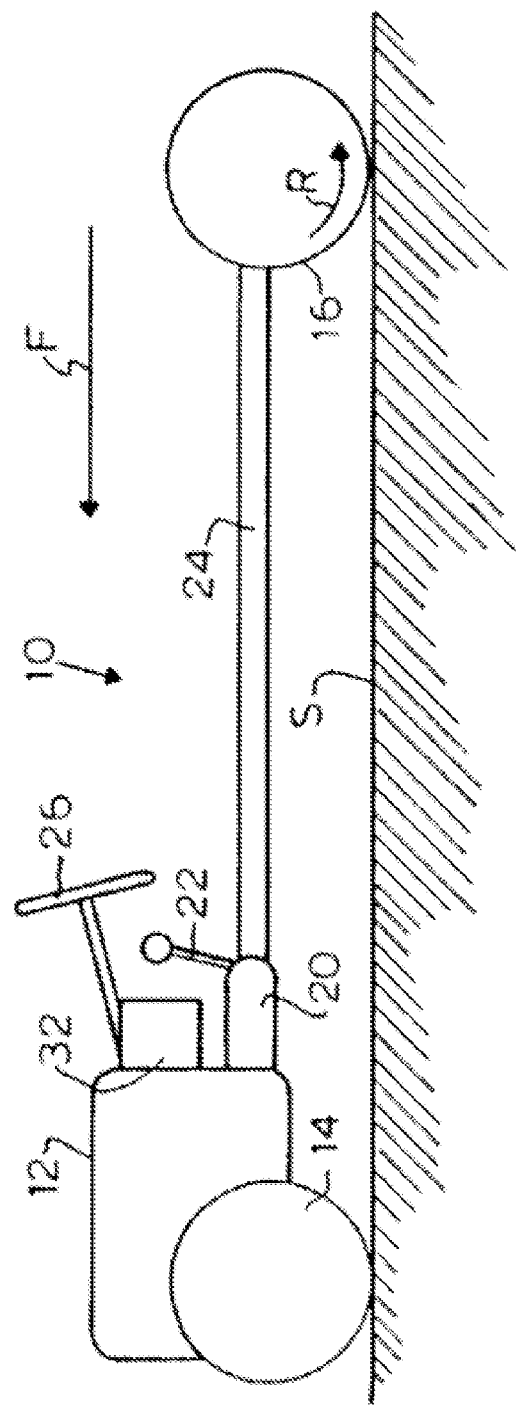
FIG. 1 illustrates a drive system of a vehicle.

FIG. 1 illustrates a drive system of an automobile 10 that is driving on a road surface S. Automobile 10 includes an engine 12, front wheels 14, and driving wheels 16. The term "engine" is used to designate any power unit, e.g., an internal combustion engine or an electric motor. Engine 12 is connected to drive wheels 16 by transmission 20 and drive shaft 24. An engine management system 32 (also referred to herein as an engine control module) includes a microprocessor adapted to receive signals indicating the rate and condition of engine 12 and to generate signals responsive thereto for adjusting various engine operating parameters accordingly.

Transmission 20 is controlled by gear shift lever 22, and may portray a manual transmission, automatic transmission, or continuously variable transmission. Directional control of automobile 10 is achieved through steering wheel 26. As engine 12 transmits power through transmission 20 and drive shaft 24 to drive wheels 16, drive wheels 16 are rotated in the direction indicated by arrow R and automobile 10 travels in the direction indicated by arrow F. The vehicle illustrated in FIG. 1 is depicted as a "rear wheel" drive system. To move automobile 10 forward from a stopped condition, or to increase the speed of the automobile, the torque transmitted from the engine 12 to the drive wheels 16 is increased, increasing the power applied at the interface between drive wheels 16 and road surface S.

The automobile 10 may include a transmission brake (also called a transbrake), which can be a mechanism that selectively places the transmission in first and reverse gears simultaneously, effectively holding the vehicle stationary even if the accelerometer is pressed as if the footbrake was applied. The transbrake may be activated by the driver providing input to a device that causes application of electrical current to a solenoid at the transmission. The current may be applied as a result of the driver holding down a button. The button is sometimes positioned on the steering wheel of the vehicle With the transbrake engaged and the transmission locked, the engine throttle can be increased in preparation for a vehicle launch without the race driver worrying about the car moving forward. Moments before the green light illuminates on the tree, the driver releases the button, which causes electrical current that is provided to the solenoid to cease and the transbrake releasing, resulting in the car launching forward with the engine already in a high power band and the transmission in a low gear.

Some cars may need to remain in the high power band for an extended period of time, for example, cars with turbochargers. Drivers may also have a limited amount of time during which their vehicles can remain in the staging area. For these and other reasons, drivers may wish to place their vehicles in a high power band in a pre-staging area and to apply the transbrake while in the prestaging area. The system described herein may be used by drivers to move their vehicles from the prestaging area to the staging area by selectively releasing the transbrake while the drivers apply force to the vehicle accelerometers.

Figure 2:
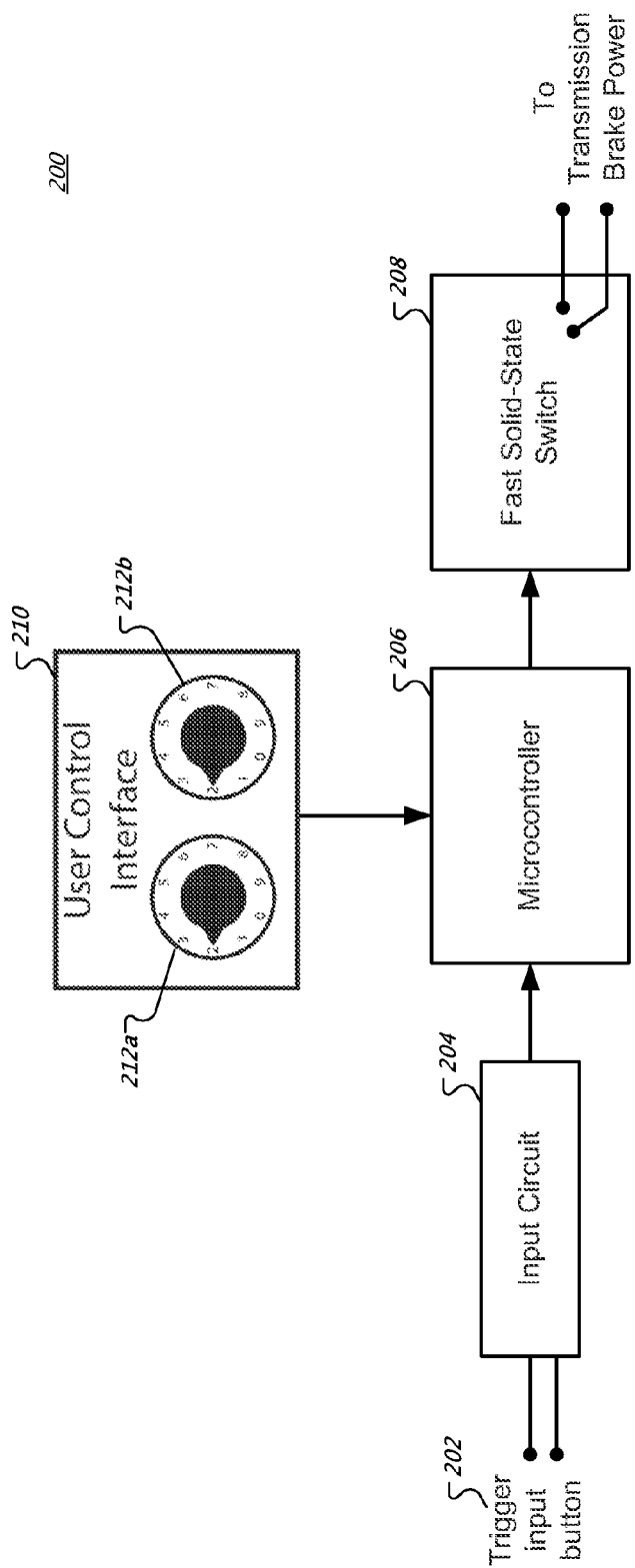
FIG. 2 illustrates a vehicle brake control system.

FIG. 2 shows an example system 200 for performing vehicle braking. In some examples, the system 200 generates, as a result of a user pressing an input device such as a trigger input button, a pulse in a signal, where the pulse momentarily disrupts power to a transmission brake. The length of the momentary disruption of power to the transmission brake may be independent of the length of time with which the user presses the trigger input button. Rather, the length of the momentary disruption of power may be modified ahead of time by a separate user input device, such as a dial.

The system for performing the vehicle braking may include a switch that is placed in series with a wire that supplies power to a solenoid that can activate the vehicle braking system. In other words, the switch may be able to disrupt power that is transmitted over the wire to the solenoid.

A high-level overview of the system discussed herein is further described with reference to FIG. 3, which shows a sequence of events for staging and launching a vehicle. During some drag races, a driver of a vehicle may move his or her vehicle into a pre-staging area. Once in the pre-staging area, the user may press a first button on the vehicle steering wheel to engage the transbrake. (The first button is referred to in FIG. 3 as the "Transbrake Activation Button.") The first button may complete a circuit that applies power to the transbrake. The user may then press down the accelerator to cause the vehicle engine to go into a high power band.

When the time is appropriate for the driver to move his or her vehicle forward into the staging area, the user can press a second button on his or her steering wheel. (The second button is referred to in FIG. 3 as the "Staging Device Button".) This second button may cause a momentary disruption in the circuit that applies power to the transbrake, resulting in the transbrake releasing and the vehicle jumping forward a short distance. The length of the momentary disruption may be defined by another user control interface that the user had already set during previous test runs, and may range between 1 and 999 milliseconds. The first button may remain engaged throughout this process.

Each press of the second button may cause the same length disruption in power to the transbrake regardless of the length of time that the user presses the second button, so long as the user has not manipulated the other user control interface to change the length of the momentary disruption. Indeed, the length that the user presses the second button may exceed the length of the disruption in power to the transbrake.

This whole time, the driver has been holding down the first button, which had been activating the transbrake. As the beams change on the tree, the driver may be able to anticipate when the tree will turn green, and just a moment before the tree turns green, the driver may release the first button, causing the vehicle to lurch forward with full power and accelerate down the race track.

Figure 3:
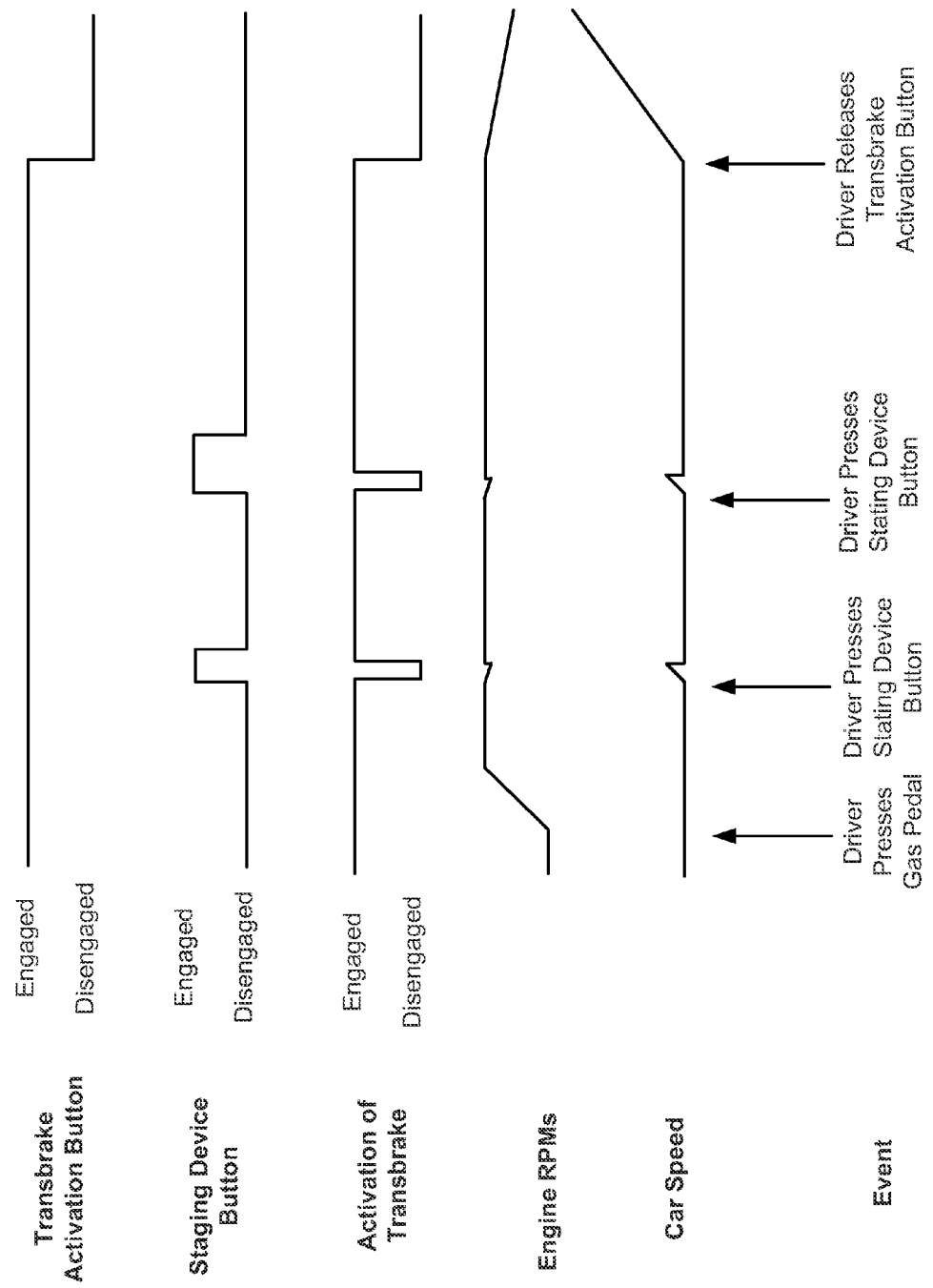
FIG. 3 illustrates a sequence of events for staging and launching a vehicle.

The sequence that is shown in FIG. 3 for the "Activation of Transbrake" portion of the figure illustrates whether or not the transbrake is activated at a given time, and may be controlled by power supplied by a circuit that is affected by both the transbrake activation button and the staging device button. In some examples, the activation of the transbrake is governed by a wire in which a switch that is governed by the transbrake activation button and a switch that governed by the staging device button are connected in series.

Now describing FIG. 2 in more detail, the trigger input button 202 may be the above-described second button that, when pressed by a user, causes the vehicle to jump forward a predesignated distance that corresponds to a predesignated time. The button has been described as a push button that may be mounted to the steering wheel of the vehicle, but the button may in fact be any sort of input device that is positioned within reach of the driver of the vehicle while sitting in the vehicle, and with which the driver of the vehicle can contact to cause a small movement forward of the vehicle (e.g., any movement between 5 mm and 30 cm).

The input circuit 204 may serve as an interface between the trigger input button 202 and the microcontroller 206. The input circuit 204 may serve to debounce button presses so that a single user contact with the button results in a single user input being provided to the microcontroller 206.

The microcontroller 206 may monitor signals received from the input circuit 204 and, upon receiving an indication that the button has been pressed (e.g., through a change in voltage applied to one or more microcontroller pins), provides a signal to deactivate a switch (e.g., the fast solid-state switch 208). The signal may be the application of voltage to one or more microcontroller pins or the termination of voltage that was being applied to the one or more microcontroller pins. The signal to deactivate the switch may include a momentary pulse in the signal (where the pulse can be the application of voltage or the removal of the voltage).

The switch 208 may open upon receiving the signal that is provided by the microcontroller, and the switch may remain open until the signal ends (e.g., until the pulse ends). Opening the switch may cause disruption in power to the transmission brake. In some implementations, a circuit can be designed so that closing the switch 208 causes the power to the transmission brake to disrupt. In either event, a user pressing of the trigger input button 202 causes a momentary release of the transbrake and a subsequent reengaging of the transbrake. Both the release and the reengaging may be triggered by a user contacting the switch, and the reengaging may occur automatically at a predesignated time after the engaging of the transbrake.

The microcontroller 206 may be configured to generate a single pulse with each press of the trigger input button 202, and may not be configured to provide a pulse-modulated signal with each press of the trigger input button 202. As such, the switch 208 may open a single time with each press of the trigger input button 202, and may not turn on and off multiple times with each activation of the trigger input button 202.

The length of time that the microcontroller 206 provides the signal (and thus the amount of time that the switch 208 remains open and the transbrake is deactivated or released) may be controlled by a value in a register of the microcontroller 206. The microcontroller may periodically check a voltage that is applied to one or more pins of the microcontroller, and may set the value of the register based on the voltage that is applied to the one or more pins. The voltage that is applied to the one or more pins may be controlled by user control interface 210. The user control interface 210 may include multiple knobs, such as course adjustment knob 212a and fine adjustment knob 212b. As such, the user can change the knobs 212a-b to modify the amount of time that the transbrake is deactivated upon a user pressing the staging device button. As an alternative to multiple knobs, the user control interface 210 can include a single knob, one or more membrane switches, one or more push buttons, a joy stick, a touchscreen, a remote device communicating over a wireless interface, or a smartphone or tablet that is running an application program for modifying the length of the transbrake disengagement. The user may change the knobs prior to pressing the staging device button, and through experimentation, can identify the knob settings that result in an appropriate length of transbrake disengagement for the characteristics of the vehicle. The user may not adjust either of the knobs 212a-b while the trigger input button 202 is being pressed, and may not adjust either of the knobs 212a-b while the transbrake activation button has been pressed (as described with reference to FIG. 3).

Figure 4:
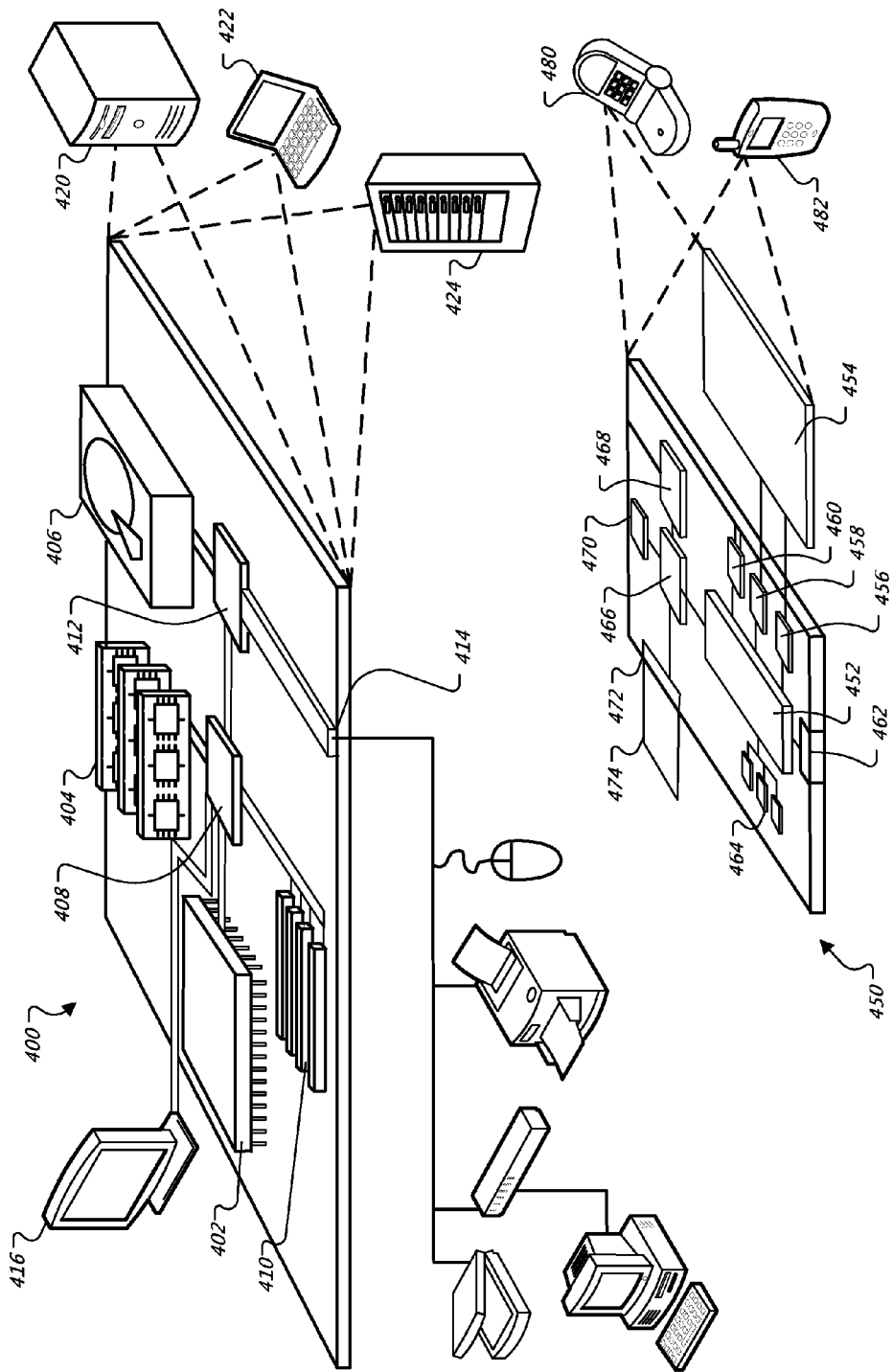
FIG. 4 is a block diagram of computing devices that may be used to implement the systems and methods described in this document, as either a client or as a server or plurality of servers.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low speed controller 412 manages lower bandwidth-intensive operations. Such allocation of functions is by way of example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, some of which are shown in the figure. For example, it may be implemented as a cellular telephone 480. It may also be implemented as part of a smartphone 482, personal digital assistant, or other similar mobile device.

Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for releasing a vehicle brake, comprising:
   identifying, by a computing system and based on received first user input, a length of time for which to provide a signal,
   wherein the received first user input includes a user manipulating at least one dial so as to set course adjustments in the length of time for which to provide the signal and at least one dial to set fine adjustments in the length of time for which to provide the signal;
   receiving, by the computing system, an indication that the user has provided second input to cause a momentary release in a vehicle braking system; and
   providing, by the computing system, the signal so as to cause the momentary release in the vehicle braking system, wherein a length of the momentary release in the vehicle braking system is independent of a length of time that the user provided the second input to cause the momentary release in the braking system.

2. The computer-implemented method of claim 1, wherein the vehicle braking system is a transmission brake.

3. The computer-implemented method of claim 1, wherein:
   the received indication is received as a result of the user pressing a button; and
   the length of the momentary release in the vehicle braking system is independent of the length of time that the user pressed the button.

4. The computer-implemented method of claim 3, wherein the button is located on a steering wheel of the vehicle.

5. The computer-implemented method of claim 1, wherein the momentary release in the vehicle braking system is a result of a disruption of power that is applied to a solenoid of a transmission brake of the vehicle braking system, the disruption of power a result of the providing of the signal so as to cause the momentary release in the vehicle braking system.

6. The computer-implemented method of claim 5, wherein the power that is applied to the solenoid is power that is provided to the solenoid as a result of the user providing other user input, wherein a length of time for which the power is provided to the solenoid is at least partially dependent on a length of time for which the user provides the other user input.

7. The computer-implemented method of claim 1, wherein the provided second input to cause a momentary release in the vehicle braking system has a duration that exceeds a duration of the length of the momentary release in the vehicle braking system.

8. One or more non-transitory computer-readable devices including instructions that, when executed by one or more processors, cause performance of a method, the method comprising:
   identifying, by a computing system and based on received first user input, a length of time for which to provide a signal,
   wherein the received first user input includes a user manipulating at least one dial so as to set course adjustments in the length of time for which to provide the signal and at least one dial to set fine adjustments in the length of time for which to provide the signal;
   receiving, by the computing system, an indication that the user has provided second input to cause a momentary release in a vehicle braking system; and
   providing, by the computing system, the signal so as to cause the momentary release in the vehicle braking system, wherein a length of the momentary release in the vehicle braking system is independent of a length of time that the user provided the second input to cause the momentary release in the braking system.

9. The one or more non-transitory computer-readable devices of claim 8, wherein the vehicle braking system is a transmission brake.

10. The one or more non-transitory computer-readable devices of claim 8, wherein:
   the received indication is received as a result of the user pressing a button; and
   the length of the momentary release in the vehicle braking system is independent of the length of time that the user pressed the button.

11. The one or more non-transitory computer-readable devices of claim 10, wherein the button is located on a steering wheel of the vehicle.

12. The one or more non-transitory computer-readable devices of claim 8, wherein the momentary release in the vehicle braking system is a result of a disruption of power that is applied to a solenoid of a transmission brake of the vehicle braking system, the disruption of power a result of the providing of the signal so as to cause the momentary release in the vehicle braking system.

13. The one or more non-transitory computer-readable devices of claim 12, wherein the power that is applied to the solenoid is power that is provided to the solenoid as a result of the user providing other user input, wherein a length of time for which the power is provided to the solenoid is at least partially dependent on a length of time for which the user provides the other user input.

14. The one or more non-transitory computer-readable devices of claim 8, wherein the provided second input to cause a momentary release in the vehicle braking system has a duration that exceeds a duration of the length of the momentary release in the vehicle braking system.

* * * * *